(No Model.)

J. ZIHLMANN.
GLASS MANUFACTURE.

No. 496,334. Patented Apr. 25, 1893.

Witnesses
Louis G. Julihn
Eric G. Julihn

Inventor
Joseph Zihlmann
By Hopkins & Atkins
Attorneys

UNITED STATES PATENT OFFICE.

JOSEPH ZIHLMANN, OF NORTH BALTIMORE, OHIO.

GLASS MANUFACTURE.

SPECIFICATION forming part of Letters Patent No. 496,334, dated April 25, 1893.

Application filed July 23, 1892. Serial No. 441,017. (No model.)

*To all whom it may concern:*

Be it known that I, JOSEPH ZIHLMANN, of North Baltimore, county of Wood, State of Ohio, have invented certain new and useful Improvements in Glass Manufacture, of which the following is a specification, reference being had to the accompanying drawings.

The object of my invention is to provide means for more effectually clarifying molten glass as it is prepared in the crucible than those now in use. As is well known in the art, great care must be exercised in order to prevent the presence in the metal of bodies or particles which tend to produce unevenness or imperfection in the manufactured article. By the utmost care it is almost impossible to prevent the presence of certain particles which, while they do not produce the most glaring defect in the article manufactured from the glass, tend to produce a want of homogeneity in the glass that occasions the presence of cords of wavy lines in the completed article.

By my invention I am able to so thoroughly clean or purify the molten metal as to prevent the presence of even such small particles and to produce a practically clear, homogeneous metal, the articles manufactured from which are without unevenness or the objectionable cords above referred to.

Figure 3:
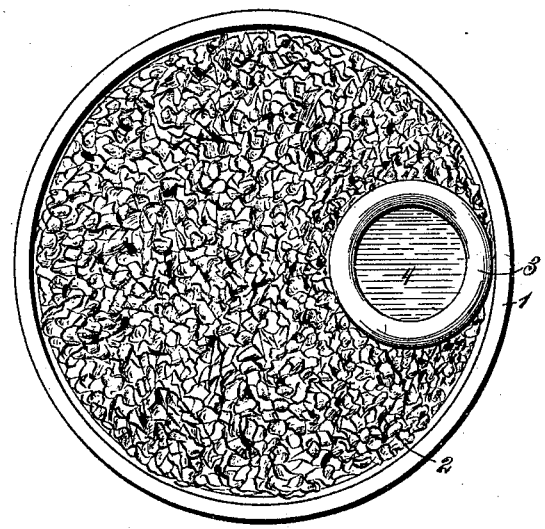
Figure 1:
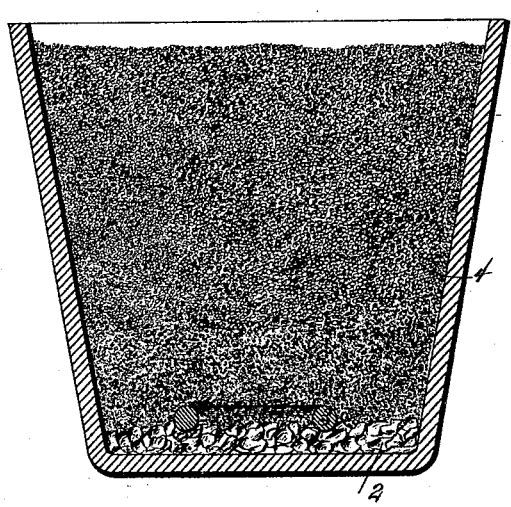
Figure 2:
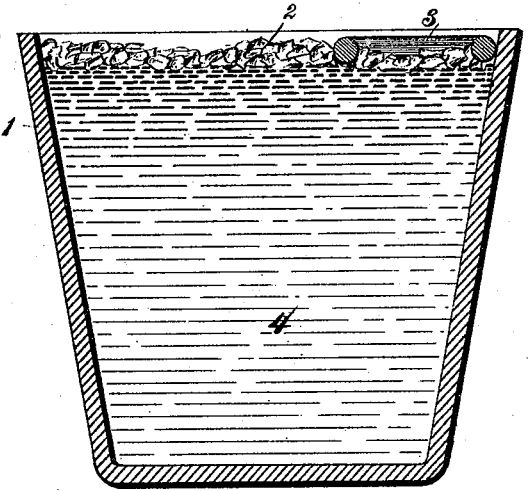

In the accompanying drawings: Figure 1 shows, in cross section, a crucible filled in its lower part, as is preferred in starting, with suitable material provided with the ordinary clarifying ring, well known in the art, and filled with the batch composed of a suitable silica, for example, and the other necessary ingredients to form glass. The contents are shown in the position in which they are preferably placed in the beginning. Fig. 2 is a sectional view of the crucible showing the contents, as above described, after fusion takes place, showing the clarifying ring and the material formerly in the bottom resting upon the top of the clear molten mass. Fig. 3 is a plan view of the crucible shown in Fig. 2.

Referring to the figures on the drawings:— 1, indicates the crucible which may be of any suitable or ordinary material and of any well-known form, either that which is used in the manufacture of crown glass, as illustrated, or that which is used in the manufacture of flint glass having a closed top and a side opening.

2, indicates a layer of suitable thickness and of proper material which, in the first place in carrying out my process, is first spread over the bottom of the crucible. This material consists of pieces of any suitable base from which the glass is manufactured. In the manufacture of ordinary glass, silica is used and pieces or chunks of sand stone are used as the material for forming this bottom layer. Any suitable material, however, preferably of the same kind as is combined to form the batch may be employed. The reason that the sand stone is not quickly melted is not only that it is unmixed with a flux, but also that being in solid masses instead of pulverized or crushed it is not exposed to the action of the flux mixture with which it does come in contact. It is placed into the crucible without flux of any kind and in it is the well-known clarifying ring 3, which may be also made of any suitable material.

4, indicates a batch of suitable material with which, after the first step has been taken, as above described, the crucible is filled for melting. When the sand stone, I will say, has been placed in the bottom of the crucible, the clearing ring being in it and the crucible filled with the batch, heat is applied in the ordinary manner.

After the crucible, prepared as above, has been subjected to a sufficiently high temperature for a sufficient length of time and the material has been treated in the ordinary manner, it will become a perfectly liquefied mass, on account of the action of the flux in the material placed in the bottom of the crucible, that part of the contents of the vessel, as well as the ring on top of it, being of less specific gravity than the mass of metal will rise gradually to the surface, forming a single mass or sheet passing upward through the molten metal until it reaches the top. The effect in passing through the metal is to strain or filter it of all impurities and to leave below the crust which it forms on top a refined mass of metal. When the process is complete and the filter and ring have risen to the top, the ring may be, by any suitable instrument, lifted and the crust of clarifying material lying immediately in it pushed outside the ring, so as to permit ready access to the clear molten metal for manipulating it or treating it in the ordinary manner. Thereupon, the ring is let down and thereafter performs its ordinary office of keeping the inclosed area of the metal free from ordinary foreign substances.

The object of using a clarifier of the same base as is used in glass metal is to prevent the deposit into the clarified mixture of a foreign or adulterating substance. As stated, above, the unfluxed material will not melt but will rise to the top of the molten metal. This is, generally speaking, correct, but in process of time and by using the same material repeatedly the unfluxed material will be gradually consumed from without and it is necessary, therefore, from time to time to replenish it. With that exception, the same unfluxed material or clarifier, I will call it, may be used repeatedly because as the clarified molten metal is withdrawn, the clarifier settles again to the bottom, ready for a repetition of the process, as above described.

As above described, in starting a new crucible, I cover the bottom with the unfluxed mass of material; and it will be obvious from the description of the process that such a method is always preferable. Since, however, partial results may be obtained by placing chunks of sand stone into the crucible without regard to the particular position, and since after one melting of the clarifier always settles to the bottom of the crucible and thereafter acts in the manner heretofore explained, I wish it to be distinctly understood that I do not limit myself to the location of the unfluxed mass within the crucible.

What I claim is—

1. The process of clarifying molten glass, which process consists in placing in the crucible in which the glass is to be melted a suitable unfluxed material, as specified, filling the crucible with a suitable glass flux mixture, and applying heat to the crucible until the flux mixture shall have become sufficiently melted and the unfluxed substance shall have risen to the top, substantially as and for the purpose specified.

2. The process of clarifying molten glass, which process consists in placing in the crucible a suitable unfluxed material, substantially as specified, providing a clarifying ring in the same, filling the crucible with a flux mixture, applying heat to the crucible until the flux material shall have melted and the unfluxed material shall have risen to the top, clearing the surface of the molten metal of the unfluxed material within the ring and replacing the ring in position, substantially as and for the purpose specified.

In testimony of all which I have hereunto subscribed my name.

JOSEPH ZIHLMANN.

Witnesses:
HOLMES E. OFFLEY,
JOSEPH L. ATKINS.